(12) United States Patent
Wang et al.

(10) Patent No.: US 12,331,383 B2
(45) Date of Patent: Jun. 17, 2025

(54) MAGNESIUM ALLOY HOUSING FOR AN ELECTRIC VEHICLE DRIVE UNIT

(71) Applicant: GM Global Technology Operations LLC, Detroit, MI (US)

(72) Inventors: Qigui Wang, Rochester Hills, MI (US); Lokesh Choudhary, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 756 days.

(21) Appl. No.: 17/546,363

(22) Filed: Dec. 9, 2021

(65) Prior Publication Data
US 2023/0183842 A1  Jun. 15, 2023

(51) Int. Cl.
*F16H 57/032* (2012.01)
*C22C 23/00* (2006.01)

(52) U.S. Cl.
CPC .......... *C22C 23/00* (2013.01); *F16H 57/032* (2013.01)

(58) Field of Classification Search
CPC ....... F16H 57/032; C22C 23/02; C22C 23/00; B60Y 2200/91
See application file for complete search history.

(56) References Cited

U.S. PATENT DOCUMENTS

| | | | |
|---|---|---|---|
| 6,341,660 B1 * | 1/2002 | Schiller | B62K 11/10 180/65.6 |
| 2004/0206635 A1 * | 10/2004 | Matsumura | B05D 7/16 205/733 |

FOREIGN PATENT DOCUMENTS

| | | | | |
|---|---|---|---|---|
| EP | 3640356 A1 * | 4/2020 | | C22C 23/02 |
| JP | 2000054048 A * | 2/2000 | | |

OTHER PUBLICATIONS

NPL: on-line translation of JP-2000054048-A, Feb. 2000 (Year: 2000).*

* cited by examiner

*Primary Examiner* — Jie Yang
(74) *Attorney, Agent, or Firm* — Vivacqua Crane, PLLC

(57) ABSTRACT

A magnesium (Mg) alloy housing for a drive unit of an electric vehicle (EV) having a drive shaft connected to an electric motor is provided. The Mg alloy housing comprises a body comprising Mg alloy. The body is arranged to house the drive unit of the EV. The housing further comprises a cylindrical hub disposed on the body. The hub has a bore formed therethrough and arranged to couple the drive shaft of the electric motor to the drive unit. The hub comprises a Mg portion having an inner surface. The hub further comprises an aluminum (Al) insert having an outerface. The Al insert is arranged to be disposed on the Mg portion such that the inner surface is aligned with the outerface defining a weld interface. The Al insert comprises iron (Fe) and Manganese (Mn) and having a Fe/Mn weight ratio of between 1:20 and 1:30.

20 Claims, 6 Drawing Sheets

MAGNESIUM ALLOY HOUSING FOR AN ELECTRIC VEHICLE DRIVE UNIT

INTRODUCTION

The present disclosure relates to magnesium alloy housings for a drive unit of an electric vehicle and, more particularly, a magnesium alloy housing with an aluminum alloy insert for enhanced fatigue resistance.

Magnesium alloys have been used in electric vehicle drive units to reduce mass. Although adequate, magnesium drive unit housings at times have experienced fatigue cracking due to material properties.

SUMMARY

Thus, while current electric vehicle drive unit housings achieve their intended purpose, there is a need for a new and improved housing and method for making same.

In accordance with one aspect of the present disclosure, a magnesium (Mg) alloy housing for a drive unit of an electric vehicle (EV) having a drive shaft connected to an electric motor is provided. The Mg alloy housing comprises a body comprising Mg alloy. The body is arranged to house the drive unit of the EV.

In this aspect, the housing further comprises a cylindrical hub disposed on the body. The hub has a bore formed therethrough and is arranged to couple the drive shaft of the electric motor to the drive unit. The hub comprises a first Mg portion having a first inner surface and a second Mg portion having a second inner surface. The hub comprises an aluminum (Al) insert having a first outerface and a second outerface. The Al insert is casted between the first and second Mg portions such that the first inner surface aligns with the first outerface to define a first interface and such that the second inner surface aligns with the second outerface to define a second interface.

In accordance with this aspect, the Al insert comprises iron (Fe) and Manganese (Mn) and having a Fe/Mn weight ratio of between 1:20 and 1:30. The Al insert has a flange formed adjacent the first outerface. The flange is arranged to be loaded with a compressive stress and to transfer the compressive stress to the first interface to offset tensile stress during use, thereby minimizing fatigue and cracking thereon.

In one embodiment of this aspect, the Al insert has a composition comprising: 0.1 to 13.0 weight (wt) percent (%) silicon (Si), 0.05 to 4.0 wt % copper (Cu), 0.01 to 3.0 wt % magnesium (Mg), 0.01 to 0.2 wt % iron (Fe), 0.1 to 1.0 wt % manganese (Mn), 0 to 0.3 wt % nickel (Ni), 0 to 6.0 wt % zinc (Zn), and 0 to 0.5 wt % chromium (Cr).

In another embodiment, the Al insert is a wrought Al alloy having a composition comprising 0.1 to 1.5 wt % Si, 0.05 to 2.0 wt % Cu, 0.01 to 3.0 wt % Mg, 0.01 to 0.2 wt % Fe, 0.5 to 1.0 wt % Mn, 0 to 0.3 wt % Ni, 0.1 to 6.0 wt % Zn, 0 to 0.5 wt % Cr.

In yet another embodiment of this aspect, the Al insert is a cast aluminum alloy having a composition comprising 4.0 to 13.0 wt % Si, 0 to 4.0 wt % Cu, 0.01 to 1.5 wt % Mg, 0.01 to 0.2 wt % Fe, 0.1 to 1 wt % Mn, 0 to 0.3 wt % Ni, 0 to 3 wt % Zn, and 0 to 0.5 wt % Cr.

In one embodiment, the Fe/Mn weight ratio of the Al insert is 1:20. In another embodiment, the Fe/Mn weight ratio of the Al insert is 1:25. In yet another embodiment, the Fe/Mn weight ratio of the Al insert is 1:30.

In another embodiment, the Al insert has notches formed on the first and second outerfaces thereof for enhanced mechanical bonding. In yet another embodiment, the compressive stress is between 150 mPa and 250 mPa. In still another embodiment, each of the first and second outerfaces comprises a Zn coating thereon for enhanced metallurgical bonding at the first and second interfaces.

In accordance with another aspect of the present disclosure, a magnesium (Mg) alloy housing for a drive unit of an electric vehicle (EV) having a drive shaft connected to an electric motor is provided. The Mg alloy housing comprises a body comprising Mg alloy, the body arranged to house the drive unit of the EV. The Mg alloy housing further comprises a cylindrical hub disposed on the body. The hub has a bore formed therethrough and is arranged to couple the drive shaft of the electric motor to the drive unit. The hub comprises a first Mg portion having a first inner surface and a second Mg portion having a second inner surface.

The hub comprises an aluminum (Al) insert having a first outerface and a second outerface. The Al insert is casted between the first and second Mg portions such that the first inner surface aligns with the first outerface to define a first interface and such that the second inner surface aligns with the second outerface to define a second interface. The Al insert comprises iron (Fe) and Manganese (Mn) and has a Fe/Mn weight ratio of between 1:20 and 1:30. The Al insert has a flange formed adjacent the first outerface. The flange is arranged to be loaded with a compressive stress and to transfer the compressive stress to the first interface to offset tensile stress during use, thereby minimizing fatigue and cracking thereon.

In this aspect, the Al insert comprises 0.1 to 13.0 weight (wt) percent (%) silicon (Si), 0.05 to 4.0 wt % copper (Cu), 0.01 to 3.0 wt % magnesium (Mg), 0.01 to 0.2 wt % iron (Fe), 0.1 to 1.0 wt % manganese (Mn), 0 to 0.3 wt % nickel (Ni), 0 to 6.0 wt % zinc (Zn), and 0 to 0.5 wt % chromium (Cr).

In one embodiment, the Al insert is a wrought Al alloy having a composition comprising 0.1 to 1.5 wt % Si, 0.05 to 2.0 wt % Cu, 0.01 to 3.0 wt % Mg, 0.01 to 0.2 wt % Fe, 0.5 to 1.0 wt % Mn, 0 to 0.3 wt % Ni, 0.1 to 6.0 wt % Zn, and 0 to 0.5 wt % Cr.

In another embodiment, Al insert is a cast aluminum alloy having a composition comprising 4.0 to 13.0 wt % Si, 0 to 4.0 wt % Cu, 0.01 to 1.5 wt % Mg, 0.01 to 0.2 wt % Fe, 0.1 to 1 wt % Mn, 0 to 0.3 wt % Ni, 0 to 3 wt % Zn, and 0 to 0.5 wt % Cr.

In yet another embodiment, the Fe/Mn weight ratio of the Al insert is 1:20. In still another embodiment, the Fe/Mn weight ratio of the Al insert is 1:25. In again another embodiment, the Fe/Mn weight ratio of the Al insert is 1:30.

In another embodiment, the Al insert has notches formed on the first and second outerfaces thereof for enhanced mechanical bonding. In yet another embodiment, the compressive stress is between 150 mPa and 250 mPa. In still another embodiment, each of the first and second outerfaces comprises a Zn coating thereon for enhanced metallurgical bonding at the first and second interfaces.

In accordance with another aspect of the present disclosure, a method of making a Mg alloy housing for a drive unit of an electric vehicle (EV) having a drive shaft connected to an electric motor is disclosed. The Mg alloy housing has enhanced fatigue resistance and comprises providing a body comprising Mg alloy, the body arranged to house the drive unit of the EV and providing a cylindrical hub disposed on the body.

In this aspect, the hub has a bore formed therethrough and is arranged to couple the drive shaft of the electric motor to the drive unit. The bore has a center through which a rotational axis is defined. The hub comprises a Mg portion having an inner surface. The hub comprises an aluminum (Al) insert having an outerface. The Al insert is arranged to be disposed on the Mg portion such that the inner surface is aligned with the outerface defining a weld interface. The Al insert comprises iron (Fe) and Manganese (Mn) and has a Fe/Mn weight ratio of between 1:20 and 1:30. The Al insert has a flange formed adjacent the outerface. The flange is arranged to be loaded with a compressive stress and to transfer the compressive stress to the weld interface to offset tensile stress during use, thereby minimizing fatigue and cracking thereon.

In this aspect, the method further comprises rotating the Al insert at 500 to 3000 rpm about the rotational axis over the Mg portion and moving the Al insert to the Mg portion such that the inner surface is aligned with the outerface to define the weld interface. The method further comprises contacting the inner surface and the outerface at the weld interface with a load pressure of 10 to 300 mPa to frictional weld the Al insert and the Mg portion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Aspects of the present disclosure provide a magnesium alloy housing for a drive unit of an electric vehicle. The housing has a magnesium alloy body and a hub disposed on the body. The hub is comprised of an aluminum alloy portion or insert to which magnesium alloy is die casted. The aluminum alloy portion has a predetermined iron/manganese weight percent ratio that is relatively lower than typical aluminum alloys. It has been unexpectedly found that a lower iron to manganese weight ratio (1:20 to 1:30) of the aluminum alloy portion helps in avoiding a soldering issue during die casting along with a reduction in galvanic corrosion.

Figure 1A:
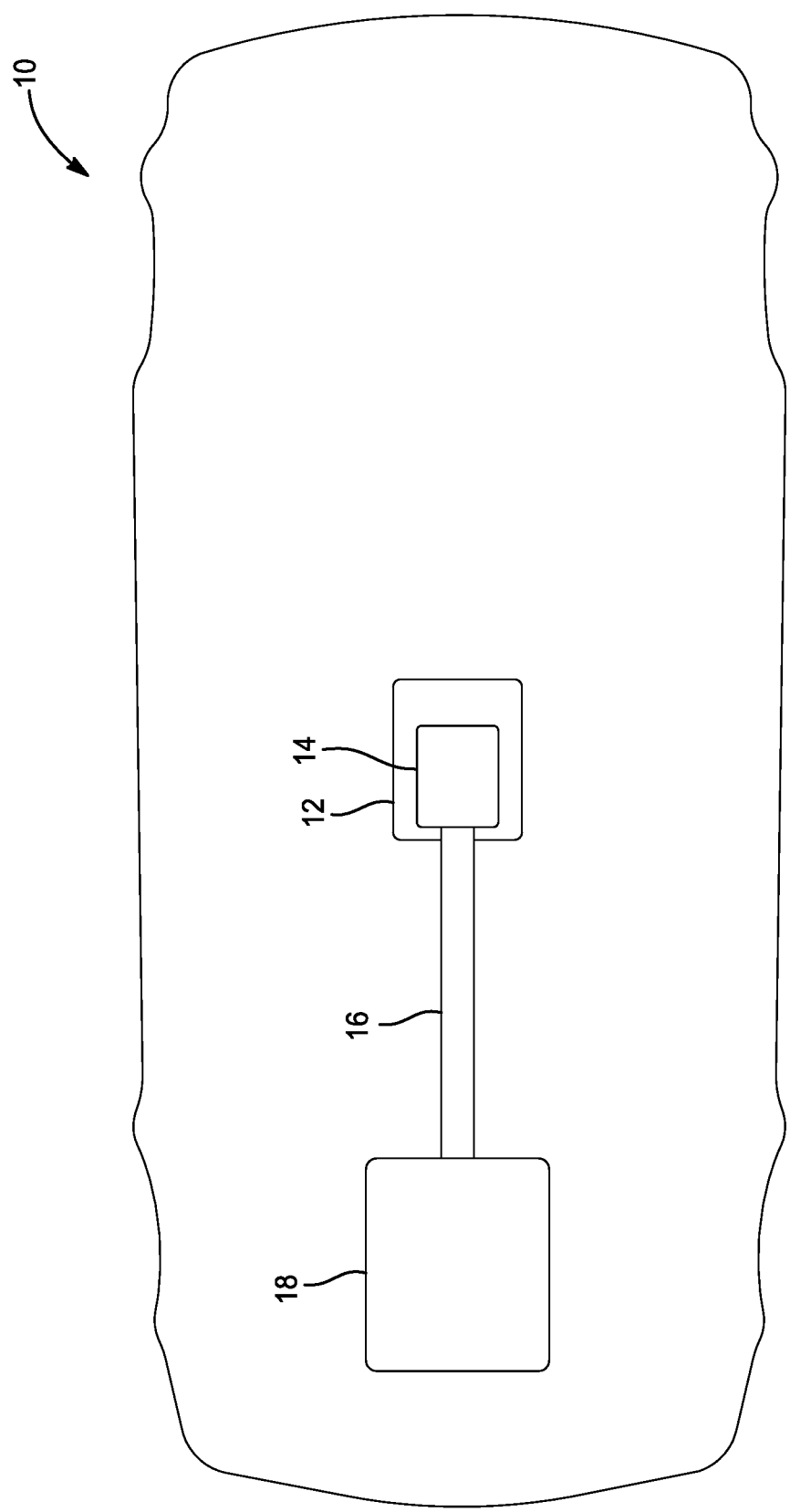
FIG. 1A is a schematic view of an electric vehicle (EV) having a magnesium (Mg) alloy housing for a drive unit thereof in accordance with one embodiment of the present disclosure.

In accordance with one embodiment of the present disclosure, FIG. 1A depicts an electric vehicle (EV) 10 having a magnesium (Mg) alloy housing 12 for a drive unit 14 thereof. As shown, the EV 10 has a drive shaft 16 that connects the drive unit 14 with an electric motor 18 of the EV 10. As it can be seen, the Mg alloy housing 12 is arranged to house the drive unit 14. By way of the drive shaft 16, the drive unit 14 is connected with the motor 18 and is arranged to transfer power generated by the motor 18.

Figure 1B:
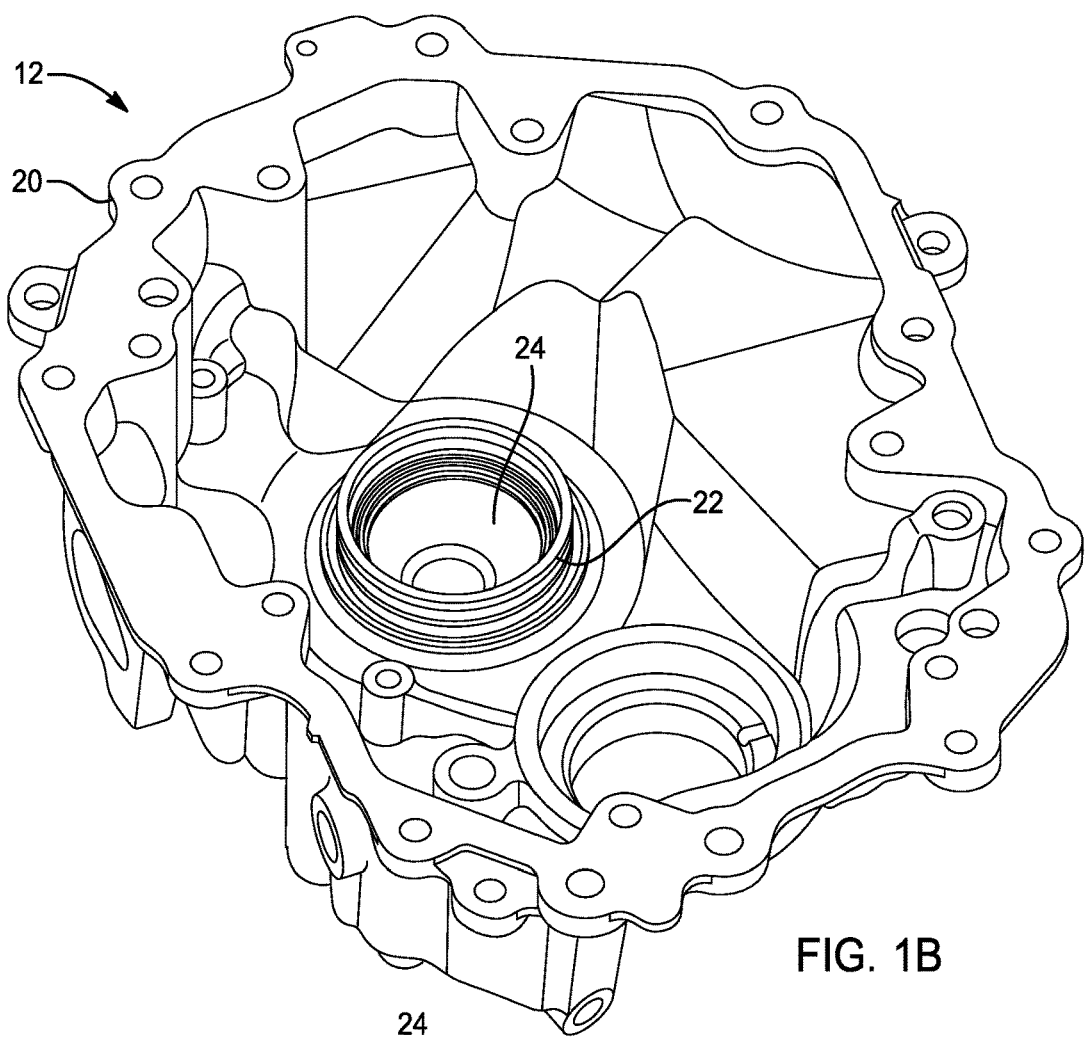
FIG. 1B is a perspective view of a magnesium (Mg) alloy housing for a drive unit of the electric vehicle (EV) of FIG. 1A in accordance with one embodiment of the present disclosure.
Figure 1C:
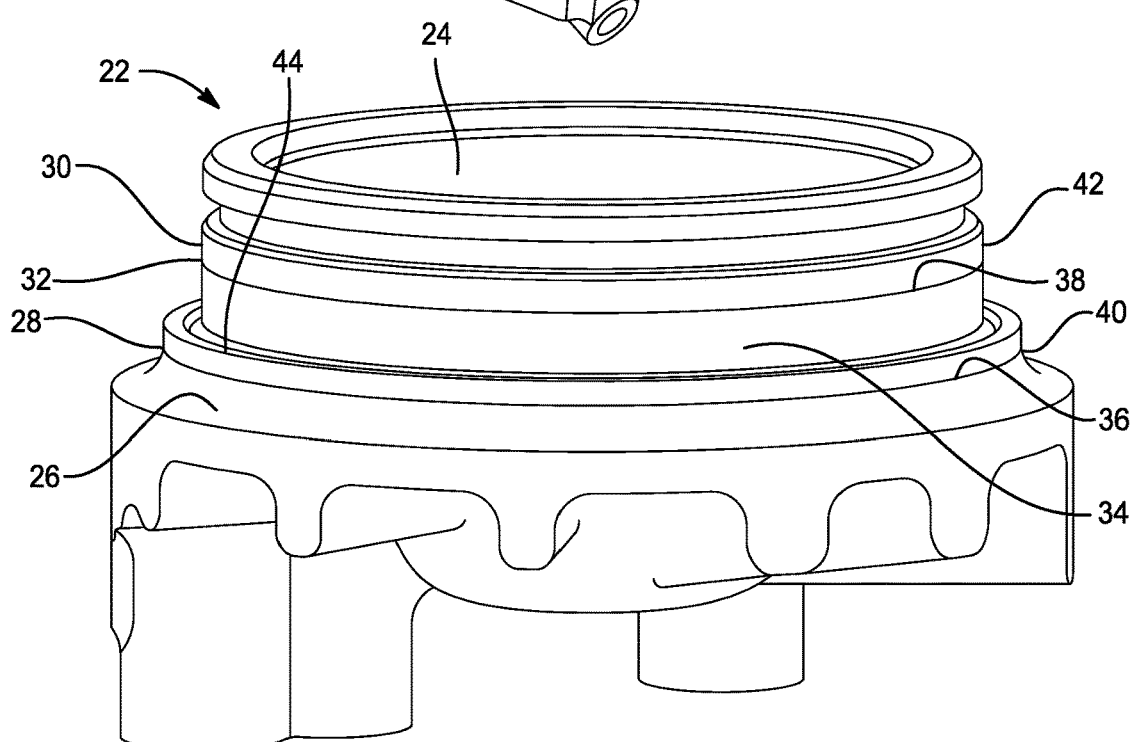
FIG. 1C is a side view of a cylindrical hub of the Mg alloy housing in FIG. 1A.

As shown in FIG. 1B, the housing 12 comprises a body 20 20 comprised of a Mg alloy. In this embodiment, the housing 12 further comprises a cylindrical hub 22 disposed on the body 20 as depicted in FIG. 1B. The hub 22 has a bore 24 formed therethrough and is arranged to couple the drive shaft 16 of the electric motor 18 to the drive unit 14. As shown, the hub 22 comprises a first Mg portion 26 having a first inner surface 28 and a second Mg portion 30 having a second inner surface 32.

Referring to FIGS. 1B-2B, the hub 22 comprises an aluminum (Al) alloy insert (hereinafter, Al insert) having a first outerface 36 and a second outerface 38. As depicted, the Al insert 34 is casted between the first and second Mg portions 26, 30. That is, the first inner surface 28 aligns with the first outerface 36 to define a first interface 40 and the second inner surface 32 aligns with the second outerface 38 to define a second interface 42. In accordance with this embodiment, the Al insert 34 comprises iron (Fe) and Manganese (Mn). Preferably, the Al insert 34 has a predetermined Fe/Mn weight ratio to avoid, minimize, or reduce a soldering issue during in die casting Mg alloys with an Al alloy. Typically, an Al alloy contains a relatively high Fe/Mn weight ratio which may result in a soldering issue during die casting Mg alloys with Al alloys along with galvanic corrosion.

It has been unexpectedly determined that applying a relatively lower Fe/Mn weight ratio results in avoiding a soldering issue during die casting along with a reduction in galvanic corrosion. In this embodiment, the predetermined Fe/Mn weight ratio of the Al insert 34 is between 1:20 and 1:30. In one embodiment, the Fe/Mn weight ratio of the Al insert 34 is 1:20. In another embodiment, the Fe/Mn weight ratio of the Al insert 34 is 1:25. In yet another embodiment, the Fe/Mn weight ratio of the Al insert 34 is 1:30.

Figure 2A:
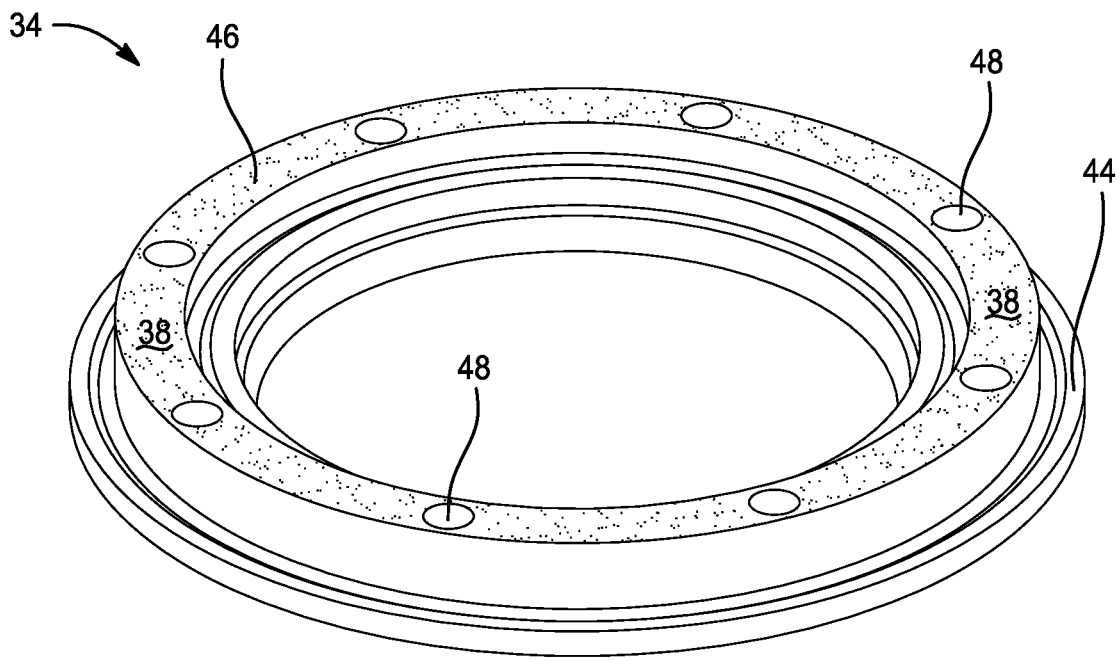
FIGS. 2A and 2B are perspective views of an aluminum (Al) alloy insert of the cylindrical hub in FIG. 1B.
Figure 2B:
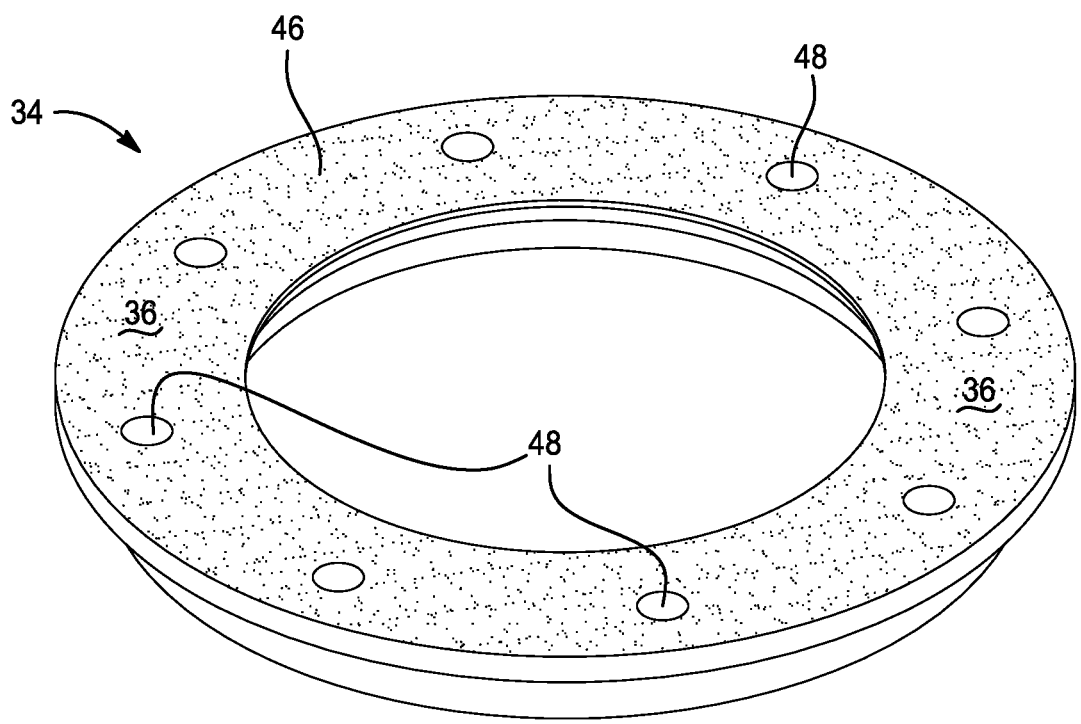

As illustrated in FIGS. 2A and 2B, the Al insert 34 has a flange 44 formed adjacent the first outerface 36 of the Al insert 34. The flange 44 is arranged to be loaded with a compressive stress and to transfer the compressive stress to the first interface 40. During operation of the EV, the compressive stress transferred to the first interface 40 will offset tensile stress thereon to thereby reduce fatigue and potential cracking at the first interface 40. Preferably, the compressive stress is between 150 mPa and 250 mPa. Moreover, the compressive stress to be loaded thereon may be determined by yield strength of the Mg alloy at the first inner surface 28. It is to be understood that the flange 44 may be loaded with compressive stress by localized rolling thereon or by any other suitable manner without departing from the spirit or scope of the present disclosure. Moreover, each of the first and second outerfaces 36, 38 comprises a Zn coating 46 thereon for enhanced metallurgical bonding with the Mg alloy at the first and second interfaces 40, 42.

In one embodiment, the Al insert 34 has a composition comprising: 0.1 to 13.0 weight (wt) percent (%) silicon (Si), 0.05 to 4.0 wt % copper (Cu), 0.01 to 3.0 wt % magnesium (Mg), 0.01 to 0.2 wt % iron (Fe), 0.1 to 1.0 wt % manganese (Mn), 0 to 0.3 wt % nickel (Ni), 0 to 6.0 wt % zinc (Zn), and 0 to 0.5 wt % chromium (Cr).

In another embodiment, the Al insert 34 is a wrought Al alloy having a composition comprising 0.1 to 1.5 wt % Si, 0.05 to 2.0 wt % Cu, 0.01 to 3.0 wt % Mg, 0.01 to 0.2 wt % Fe, 0.5 to 1.0 wt % Mn, 0 to 0.3 wt % Ni, 0.1 to 6.0 wt % Zn, 0 to 0.5 wt % Cr.

In yet another embodiment, the Al insert 34 is a cast aluminum alloy having a composition comprising 4.0 to 13.0 wt % Si, 0 to 4.0 wt % Cu, 0.01 to 1.5 wt % Mg, 0.01 to 0.2 wt % Fe, 0.1 to 1 wt % Mn, 0 to 0.3 wt % Ni, 0 to 3 wt % Zn, and 0 to 0.5 wt % Cr.

In one embodiment, the Mg alloy of the body 20 comprises 3.8 to 4.2 wt % Al, 0.3 to 0.4 wt % Mn, 0.15 to 0.25 wt % Zn, 3.8 to 4.2 wt % rare earth metals (one of Cerium (Ce) and Lanthanum (La)), and a balance of Mg.

Further referring to FIGS. 2A and 2B, the Al insert 34 may have notches 48 formed on the first outerface 36 and the second outerface 38 thereof for enhanced mechanical bonding. During die casting of Mg alloy, liquid Mg alloy will flow within the notches 48, cool, and solidify therein for enhanced mechanical bonding.

The first and second Mg portions 26, 30 in FIGS. 1B-2B may be formed with the Al insert 34 by way of die casting as known in the art. However, the Al insert 34 may be preheated to a preheated temperature of 100 to 300 degrees Celsius prior to die casting the first and second Mg portions 26, 30 to the Al insert 34. That is, as the Al insert 34 (a solid) is disposed in a die cavity of a predetermined cast (not shown), the Al insert 34 may be preheated to 100 to 300 degrees Celsius by any suitable manner for enhanced diffusion and enhance metallurgical bonding of the Al and Mg at the first and second interfaces 40, 42 during die casting. When the Al insert 34 is at the preheated temperature, the first and second Mg portions 26, 30 (molten) may be poured or injected into the die cavities of the predetermined cast and contact the Al insert 34 at the first and second interfaces 40, 42, respectively. As Al elements are more active at higher temperatures, the enhanced diffusion of the Al and Mg provides for enhanced metallurgical bonding at the first and second interfaces 40, 42.

FIGS. 3A to 4B illustrate an aluminum (Al) alloy insert 134 (hereinafter, Al insert) in accordance with another embodiment of the present disclosure. As shown, the Al insert 134 is similar to the Al insert previously discussed in FIGS. 1A-2B, but includes the second Mg portion. Referring to FIG. 3A to 4B, a magnesium (Mg) alloy housing 112 for a drive unit of an electric vehicle (EV) having a drive shaft connected to an electric motor is provided. As illustrated, the Mg alloy housing 112 comprises a body 120 comprising Mg alloy. The body 120 is arranged to house the drive unit of the EV.

In this embodiment, the Mg alloy housing 112 further comprises a cylindrical hub 122 disposed on the body 120. As depicted, the hub 122 has a bore 124 formed therethrough and is arranged to connect the drive shaft of the electric motor to the drive unit. The bore 124 has a center through which a rotational axis X is defined. The hub 122 comprises a Mg portion 126 having an inner surface 128. Moreover, the hub 122 comprises the Al insert 134 having an outerface 136. The Al insert 134 is arranged to be disposed on the Mg portion 126 such that the inner surface 128 is aligned with the outerface 136 defining a weld interface 140.

In accordance with this embodiment, the Al insert 34 comprises iron (Fe) and Manganese (Mn). Preferably, the Al insert 134 has a predetermined Fe/Mn weight ratio to avoid or minimize a soldering issue during welding or die casting Mg alloys with an Al alloy. Typically, an Al alloy contains a relatively high Fe/Mn weight ratio which may result in a soldering issue during welding or die casting Mg alloys with Al alloys along with galvanic corrosion during operation.

It has been unexpectedly determined that having a relatively lower Fe/Mn weight ratio in the Al alloy results in avoiding a soldering issue during welding or die casting along with galvanic corrosion. In this embodiment, the predetermined Fe/Mn weight ratio of the Al insert 134 is between 1:20 and 1:30. In one embodiment, the Fe/Mn weight ratio of the Al insert 34 is 1:20. In another embodiment, the Fe/Mn weight ratio of the Al insert 134 is 1:25. In yet another embodiment, the Fe/Mn weight ratio of the Al insert 134 is 1:30.

Figure 3A:
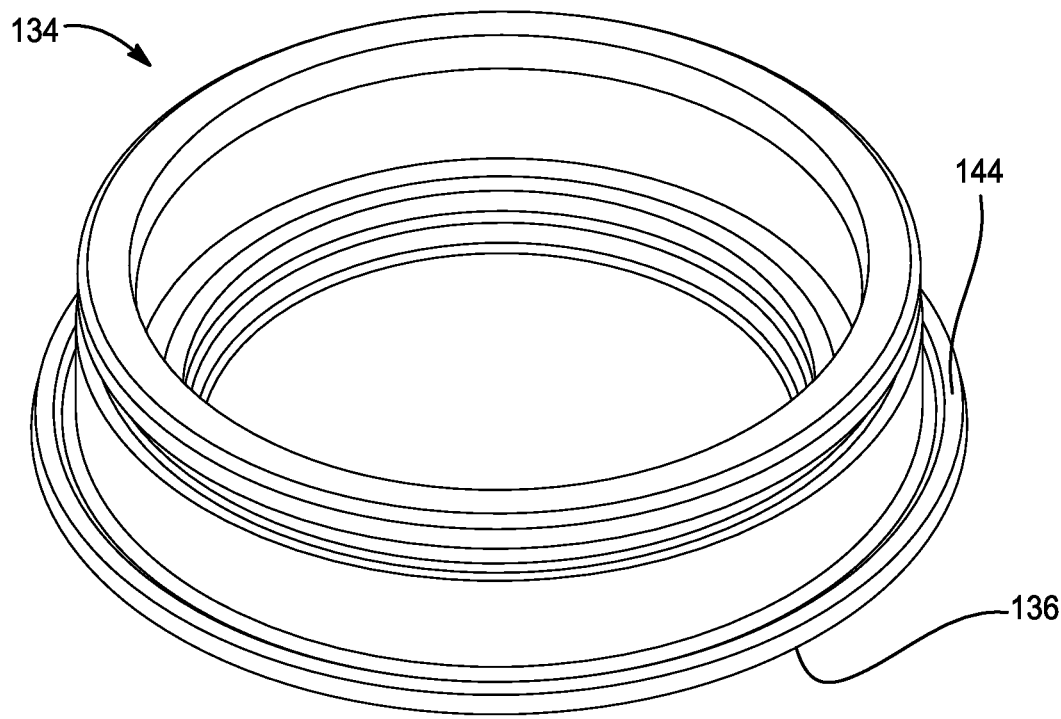
FIGS. 3A and 3B are perspective views of an Al insert of a cylindrical hub of a Mg alloy housing in accordance with another embodiment of the present disclosure.
Figure 4A:
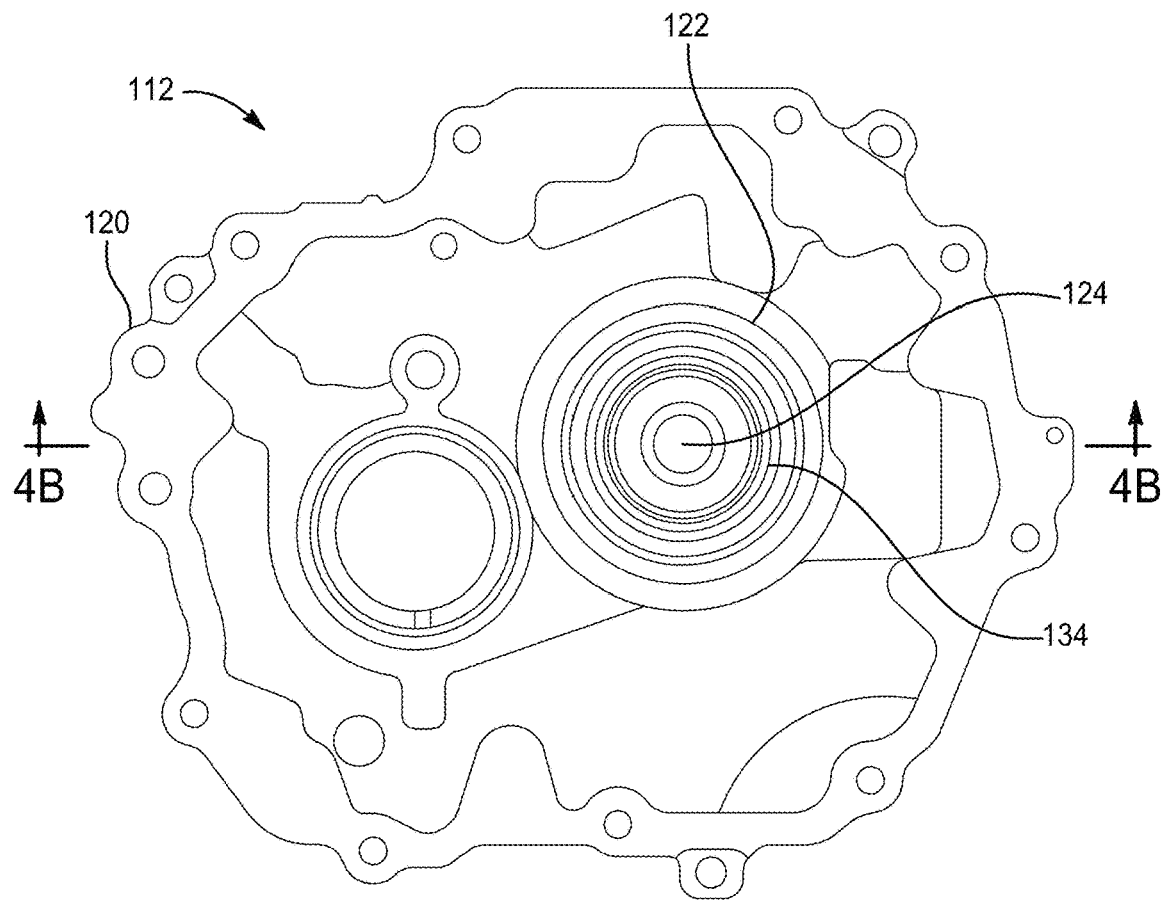
FIG. 4A is a plan view of a Mg alloy housing including the Al insert of FIGS. 3A and 3B in accordance with another embodiment.
Figure 4B:
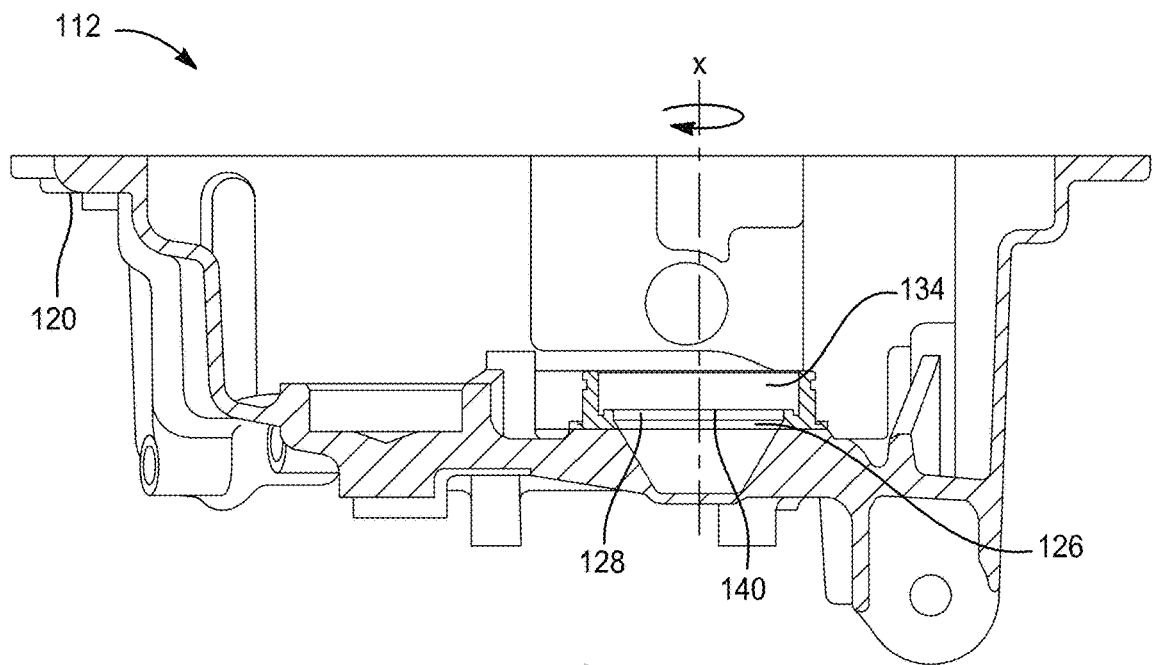
FIG. 4B is a cross-sectional view of the Mg alloy housing taken along lines 4B-4B.

As illustrated in FIGS. 3A and 4B, the Al insert 134 has a flange 144 formed adjacent the outerface. The flange 144 is arranged to be loaded with a compressive stress and to transfer the compressive stress to the interface. During operation of the EV, the compressive stress transferred to the interface will offset tensile stress thereon to thereby reduce fatigue and potential cracking at the interface. Preferably, the compressive stress is between 150 mPa and 250 mPa. Moreover, the compressive stress to be loaded thereon may be determined by yield strength of the Mg alloy at the inner surface. It is to be understood that the flange 144 may be loaded with compressive stress by localized rolling thereon or by any other suitable manner without departing from the spirit or scope of the present disclosure. Moreover, the outerface comprises a Zn coating 146 thereon for enhanced metallurgical bonding with the Mg alloy at the interface.

In one embodiment, the Al insert 134 has a composition comprising: 0.1 to 13.0 weight (wt) percent (%) silicon (Si), 0.05 to 4.0 wt % copper (Cu), 0.01 to 3.0 wt % magnesium (Mg), 0.01 to 0.2 wt % iron (Fe), 0.1 to 1.0 wt % manganese (Mn), 0 to 0.3 wt % nickel (Ni), 0 to 6.0 wt % zinc (Zn), and 0 to 0.5 wt % chromium (Cr).

In another embodiment, the Al insert 134 is a wrought Al alloy having a composition comprising 0.1 to 1.5 wt % Si, 0.05 to 2.0 wt % Cu, 0.01 to 3.0 wt % Mg, 0.01 to 0.2 wt % Fe, 0.5 to 1.0 wt % Mn, 0 to 0.3 wt % Ni, 0.1 to 6.0 wt % Zn, 0 to 0.5 wt % Cr.

In yet another embodiment, the Al insert 34 is a cast aluminum alloy having a composition comprising 4.0 to 13.0 wt % Si, 0 to 4.0 wt % Cu, 0.01 to 1.5 wt % Mg, 0.01 to 0.2 wt % Fe, 0.1 to 1 wt % Mn, 0 to 0.3 wt % Ni, 0 to 3 wt % Zn, and 0 to 0.5 wt % Cr.

In one embodiment, the Mg alloy of the body 20 comprises 3.8 to 4.2 wt % Al, 0.3 to 0.4 wt % Mn, 0.15 to 0.25 wt % Zn, 3.8 to 4.2 wt % rare earth metals (one of Cerium (Ce) and Lanthanum (La)), and a balance of Mg.

Figure 3B:
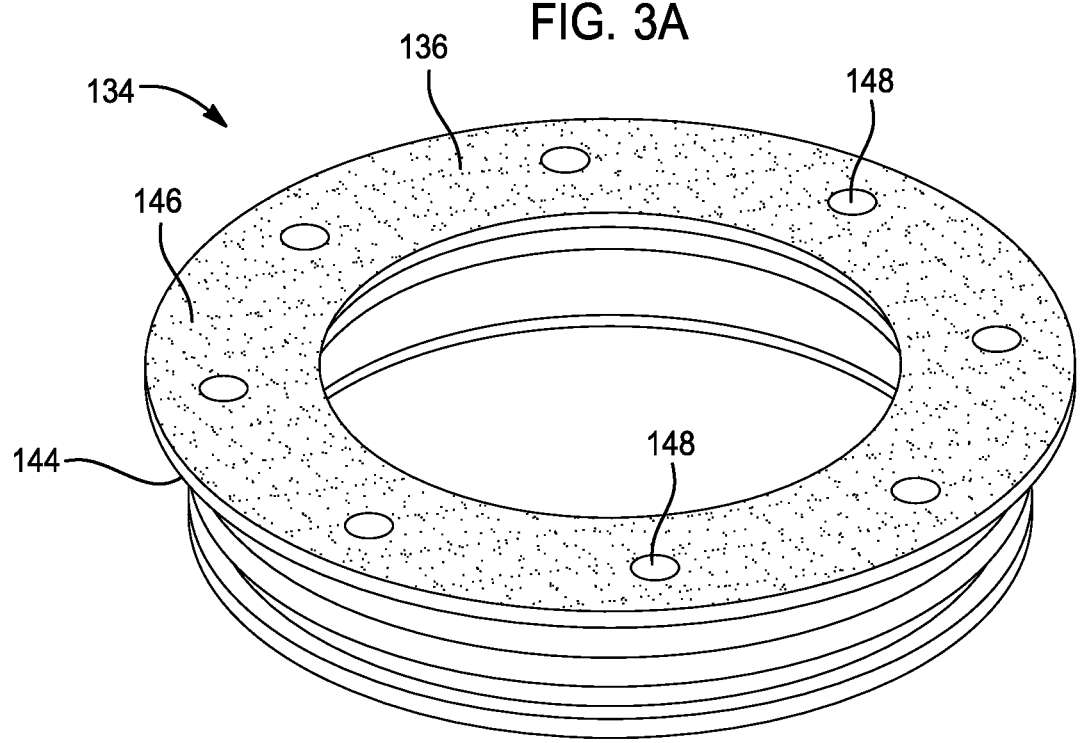

Further referring to FIG. 3B, the Al insert 134 may have notches 148 formed on the outerface thereof for enhanced mechanical bonding. During die casting of Mg alloy, liquid Mg alloy with flow within the notches 148, cool, and solidify therein for enhanced mechanical bonding.

Figure 5:
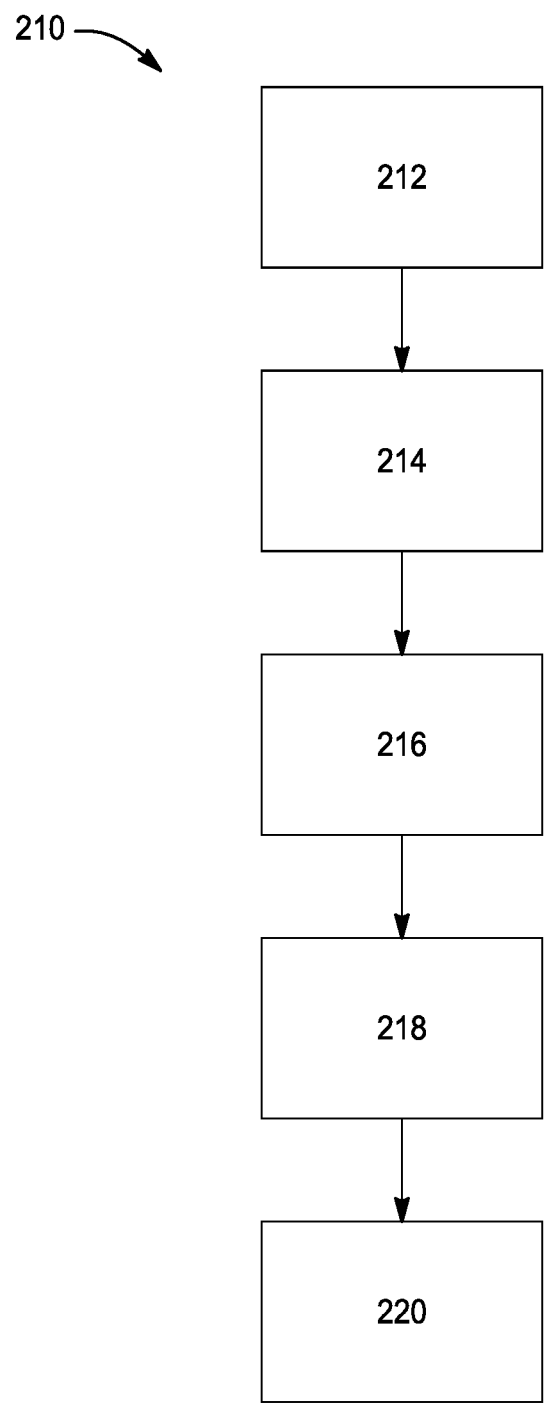
FIG. 5 is a flowchart of a method of friction welding a Mg alloy housing having an Al alloy insert.

Referring to FIG. 5 and in accordance with another aspect of the present disclosure, a method 210 of friction welding a Mg alloy housing for a drive unit of an electric vehicle (EV) having a drive shaft connected to an electric motor is disclosed. The Mg housing has enhanced fatigue resistance. As shown, the method 210 comprises in box 212 providing a body 120 comprising Mg alloy, the body 120 arranged to house the drive unit of the EV.

As shown in FIG. 5, the method 210 further comprises in box 214 providing a cylindrical hub 122 disposed on the body 120. The cylindrical hub 122 of the method 210 may be the cylindrical hub 122 depicted in FIGS. 3A to 4B. Thus, further reference to the cylindrical hub 122 with respect to the method 210 refers to the cylindrical hub 122 shown in FIGS. 3A to 4B.

As discussed, the hub 122 has a bore 124 formed therethrough and is arranged to connect the drive shaft of the electric motor to the drive unit. The bore 124 has a center through which a rotational axis is defined. The hub 122 comprises a Mg portion having an inner surface. The hub 122 comprises the Al insert 134 having an outerface. The Al insert 34 is arranged to be disposed on the Mg portion such that the inner surface is aligned with the outerface defining a weld interface.

In this example, the body 120 is affixed to a stationary structure. Then, the method 210 further comprises in box 216 rotating the Al insert 134 at a rotating speed of 500 to 3000 rpm about the rotational axis over the Mg portion. The method 210 further comprises in box 218 moving the Al insert 134 to the Mg portion such that the inner surface is aligned with the outerface to define the weld interface. The method 210 further comprises in box 220 contacting the inner surface and the outerface at the weld interface with a load pressure of 10 to 300 mPa to frictional weld the Al insert 134 and the Mg portion. That is, as the outerface contacts the inner surface at the rotating speed of 500 to 3000 rpm with the load pressure of 10 to 300 mPa, the Al insert 134 is rotational welded to the inner surface to define the interface.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A magnesium (Mg) alloy housing for a drive unit of an electric vehicle (EV) having a drive shaft connected to an electric motor, the Mg alloy housing comprising:
   a body comprising a Mg alloy, the body arranged to house the drive unit of the EV; and
   a cylindrical hub disposed on the body, the hub having a bore formed therethrough and arranged to couple the drive shaft of the electric motor to the drive unit, the hub comprising a first Mg portion having a first inner surface and a second Mg portion having a second inner surface, the hub comprising an aluminum (Al) alloy insert having a first outerface and a second outerface, the Al alloy insert being casted between the first and second Mg portions such that the first inner surface aligns with the first outerface to define a first interface and such that the second inner surface aligns with the second outerface to define a second interface, the Al alloy insert having a flange formed adjacent the first outerface, the flange arranged to be loaded with a compressive stress and to transfer the compressive stress to the first interface to offset tensile stress during use, thereby minimizing fatigue and cracking thereon, and wherein each of the first and second outerfaces comprises a zinc (Zn) coating thereon for metallurgical bonding with the Mg alloy at the first and second interfaces.

2. The housing of claim 1 wherein the Al alloy insert has a composition comprising:
   0.1 to 13.0 weight (wt) percent (%) silicon (Si);
   0.05 to 4.0 wt % copper (Cu);
   0.01 to 3.0 wt % magnesium (Mg);
   0.01 to 0.2 wt % iron (Fe);
   0.1 to 1.0 wt % manganese (Mn);
   0 to 0.3 wt % nickel (Ni);
   0 to 6.0 wt % zinc (Zn); and
   0 to 0.5 wt % chromium (Cr); and
   a balance of aluminum.

3. The housing of claim 1 wherein the Al alloy insert is a wrought Al alloy having a composition comprising:
   0.1 to 1.5 wt % Si;
   0.05 to 2.0 wt % Cu;
   0.01 to 3.0 wt % Mg;
   0.01 to 0.2 wt % Fe;
   0.5 to 1.0 wt % Mn;
   0 to 0.3 wt % Ni;
   0.1 to 6.0 wt % Zn;
   0 to 0.5 wt % Cr; and
   a balance of aluminum.

4. The housing of claim 3 wherein the Mg alloy comprises 3.8 to 4.2 wt % Al, 0.3 to 0.4 wt % Mn, 0.15 to 0.25 wt % Zn, 3.8 to 4.2 wt % rare earth metals (one of Cerium (Ce) and Lanthanum (La)), and a balance of Mg.

5. The housing of claim 1 wherein the Al alloy insert is a cast aluminum alloy having a composition comprising:
   4.0 to 13.0 wt % Si;
   0 to 4.0 wt % Cu;
   0.01 to 1.5 wt % Mg;
   0.01 to 0.2 wt % Fe;
   0.1 to 1 wt % Mn;
   0 to 0.3 wt % Ni;
   0 to 3 wt % Zn;
   0 to 0.5 wt % Cr; and
   a balance of aluminum.

6. The housing of claim 1 wherein the Fe/Mn weight ratio of the Al alloy insert is 1:20.

7. The housing of claim 1 wherein the Fe/Mn weight ratio of the Al alloy insert is 1:30.

8. The housing of claim 1 wherein the Al alloy insert has notches formed on the first and second outerfaces thereof for mechanical bonding.

9. The housing of claim 1 wherein the compressive stress is between 150 mPa and 250 mPa.

10. The housing of claim 1 wherein the Al alloy insert comprises iron (Fe) and Manganese (Mn) and having a Fe/Mn weight ratio of between 1:20 and 1:30.

11. A magnesium (Mg) alloy housing for a drive unit of an electric vehicle (EV) having a drive shaft connected to an electric motor, the Mg alloy housing comprising:
   a body comprising a Mg alloy, the body arranged to house the drive unit of the EV; and
   a cylindrical hub disposed on the body, the hub having a bore formed therethrough and arranged to couple the drive shaft of the electric motor to the drive unit, the hub comprising a first Mg portion having a first inner surface and a second Mg portion having a second inner surface, the hub comprising an aluminum (Al) alloy insert having a first outerface and a second outerface, the Al alloy insert being casted between the first and second Mg portions such that the first inner surface aligns with the first outerface to define a first interface and such that the second inner surface aligns with the second outerface to define a second interface, the Al alloy insert having a flange formed adjacent the first outerface, the flange arranged to be loaded with a compressive stress and to transfer the compressive stress to the first interface to offset tensile stress during use, thereby minimizing fatigue and cracking thereon, wherein each of the first and second outerfaces comprises a zinc (Zn) coating thereon for metallurgical bonding with the Mg alloy at the first and second interfaces, the Al alloy insert comprising:
0.1 to 13.0 weight (wt) percent (%) silicon (Si),
0.05 to 4.0 wt % copper (Cu),
0.01 to 3.0 wt % magnesium (Mg),
0.01 to 0.2 wt % iron (Fe),
0.1 to 1.0 wt % manganese (Mn),
0 to 0.3 wt % nickel (Ni),
0 to 6.0 wt % zinc (Zn),
0 to 0.5 wt % chromium (Cr), and
a balance of aluminum.

12. The housing of claim 11 wherein the Al alloy insert is a wrought Al alloy having a composition comprising:
0.1 to 1.5 wt % Si;
0.05 to 2.0 wt % Cu;
0.01 to 3.0 wt % Mg;
0.01 to 0.2 wt % Fe;
0.5 to 1.0 wt % Mn;
0 to 0.3 wt % Ni;
0.1 to 6.0 wt % Zn;
0 to 0.5 wt % Cr; and
a balance of aluminum.

13. The housing of claim 11 wherein the Al alloy insert is a cast aluminum alloy having a composition comprising:
4.0 to 13.0 wt % Si;
0 to 4.0 wt % Cu;
0.01 to 1.5 wt % Mg;
0.01 to 0.2 wt % Fe;
0.1 to 1 wt % Mn;
0 to 0.3 wt % Ni;
0 to 3 wt % Zn;
0 to 0.5 wt % Cr; and
a balance of aluminum.

14. The housing of claim 11 wherein the Fe/Mn weight ratio of the Al alloy insert is 1:20.

15. The housing of claim 11 wherein the Fe/Mn weight ratio of the Al alloy insert is 1:25.

16. The housing of claim 11 wherein the Fe/Mn weight ratio of the Al alloy insert is 1:30.

17. The housing of claim 11 wherein the Al alloy insert has notches formed on the first and second outerfaces thereof for enhanced mechanical bonding.

18. The housing of claim 17 wherein the Mg alloy is present in the notches.

19. The housing of claim 11 wherein the compressive stress is between 150 mPa and 250 mPa.

20. The housing of claim 11 wherein the compressive stress is between 150 mPa and 250 mPa.

* * * * *